Feb. 3, 1953 J. LYMAN ET AL 2,627,400
ANGULAR VELOCITY RESPONSIVE APPARATUS
Filed Feb. 18, 1947 2 SHEETS—SHEET 1

INVENTORS
JOSEPH LYMAN, ROLAND E. BARNABY AND
RICHARD PROSKAUER
BY Herbert G. Thompson
their ATTORNEY.

Patented Feb. 3, 1953

2,627,400

UNITED STATES PATENT OFFICE 2,627,400

ANGULAR VELOCITY RESPONSIVE APPARATUS

Joseph Lyman, Huntington, Roland E. Barnaby, Hempstead, and Richard Proskauer, Westbury, N. Y., assignors to The Sperry Corporation, a corporation of Delaware Application February 18, 1947, Serial No. 729,292

6 Claims. (Cl. 264—1)

This invention relates to apparatus for measuring the absolute angular velocity of a body in space. Such apparatus may be employed for determining the rate and direction of change of attitude of movable craft, and for other purposes.

In copending Patent No. 2,513,240 of Joseph Lyman, dated July 4, 1950, angular velocity responsive apparatus is disclosed in which a mass is elastically supported on its base, and is arranged so that its moment of inertia about a selected axis is periodically varied. Upon rotation of the base about said axis, the mass is constrained by its elastic connection to rotate substantially with the base, but since the moment of inertia of the mass about the axis of rotation is alternately increasing and decreasing periodically, the rotation of the mass is not precisely that of the base, but is modulated by a rotational vibration which is synchronous with the variations of moment of inertia of the mass. The amplitude of this vibration is substantially proportional to the angular velocity of the base, and when the amplitude is measured by suitably calibrated means, the angular velocity about the response axis is thereby ascertained.

It has hitherto been proposed to make the variable inertia mass in the form of a tuning fork, with the prongs parallel to the selected axis (response axis) about which rotation is to be detected or measured. When the fork is vibrating, its moment of inertia about this axis varies synchronously with the vibration. The tuning fork is elastically coupled to the base through a section especially designed for low torsional restraint about the response axis and yet for great rigidity about the axes perpendicular to the response axis, and a pickup device is arranged to provide an output voltage varying with the torsional oscillations between the fork and the base. Over a wide range of angular velocities about the response axis, the amplitude of this voltage corresponds to the magnitude of the angular velocity of the base.

When a tuning fork is set in vibration, the tips of the prongs, and their centers of gravity as well, travel in arcuate paths. This arcuate-path vibration includes a longitudinal vibration component parallel to the response axis, either at the frequency of vibration of the prongs or at twice this frequency, depending upon the locations of the centers of curvature of these arcuate paths and upon the vibration amplitude. Even though the response-axis torsional spring section and the pickup device are designed to be primarily responsive to torsional vibrations between the fork and the base and are intended to be unresponsive to longitudinal vibrations, these elements are yet susceptible to some extent to longitudinal vibratory forces, giving slight erroneous output components resulting from the longitudinal vibration. These erroneous output components are objectionable when they interfere with the response of the instrument to very gradual turns.

It is an object of the present invention to provide an improved angular velocity responsive arrangement.

A further object of the invention is to provide an instrument for measuring absolute angular velocity which will be unaffected by vibrations transmitted to it from outside, and will not itself communicate vibrations to the structure which supports it.

More particularly, it is an object of this invention to provide angular velocity-responsive apparatus having the high performance advantages afforded by use of a modulated-inertia mass system, but free from the disadvantages of a resultant mass modulation component parallel to the response axis.

A further object is to provide angular velocity-responsive apparatus of increased sensitivity and of enhanced immunity to extraneous signals and other effects tending to obscure the signals produced at extremely low rates of turn.

An important feature of the present invention is the provision of an angular velocity-responsive arrangement comprising a mass system, the moment of inertia of which about a response axis passing through its center of gravity is periodically varied by linear movement of portions of the mass along perpendicular radii from the selected axis in such a way as to avoid any periodical displacement of the center of gravity of the whole mass. The modulated-inertia mass system is coupled to the frame or base of the apparatus by an elastic coupling of such stiffness as to make the mass system resonant for oscillation about the response axis at the frequency of the periodical variations of moment of inertia. This arrangement achieves very high sensitivity, providing reliable, significant output signals in response to turns at extremely low angular velocity.

The invention also relates to the novel features or principles of the instrumentalities described herein, whether or not such are used for the stated objects, or in the stated fields or combinations.

Other objects and advantages of the invention and the manner in which the above objects are fulfilled will be more fully understood from the ensuing description with reference to the attached drawings, in which.

Figure 1:
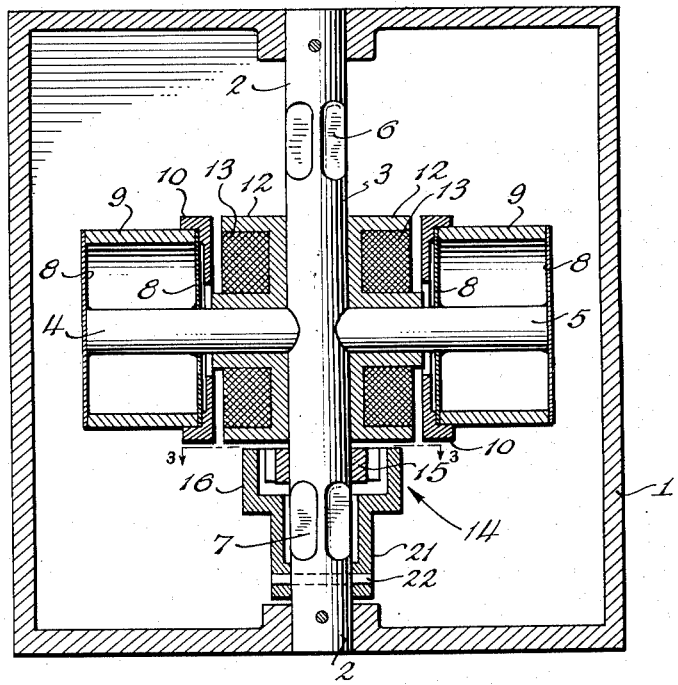
Figure 1 is a side view, partly in section, of a device embodying the invention.

Referring now to Figure 1, the numeral 1 represents a sturdy frame in which the ends of a rod 2 of steel or other elastic material are firmly anchored. This rod 2 carries a stiff horizontal cross bar 4, 5 rigidly attached to it and extending equally on either side. Each of the two branches 4 and 5 thus formed carries two circular diaphragms 8 spaced as shown and supporting at their peripheries a massive cylinder 9. The diaphragms are of steel, Phosphor bronze, or other elastic material, and are preferably planar, though they could be formed with concentric corrugations like the capsule of an aneroid barometer if desired. The arrangement is such that the cylinders 9 are capable of oscillation in a direction parallel to their own axes (coincident with the axis of the cross bar 4, 5), and therefore at right angles to the axis of the main rod 2. Owing to the constraint exerted by the diaphragms, the oscillation is purely linear, with no component motion in any other direction.

The two cylindrical masses 9, 9, on their diaphragm suspensions are electromagnetically maintained in vibration, for periodic modulation of the moment of inertia thereof about the response axis. For this purpose, each cylinder is shown closed at one end by a soft iron cap 10. A soft iron bobbin 12 containing a coil winding 13 is mounted on each of the arms 4, 5 and secured against the main rod 2. The two coil windings 13 are connected in series (Fig. 2) to insure identical current variations therethrough. These coils are supplied with periodically varying current. As the energization of the coils 13 increases toward maximum in each excitation cycle, the caps 10 and the cylinders 9 attached thereto are pulled to the maximum inward deflection (i. e., to the positions for minimum moment of inertia), and as the energization of the coils decreases in each cycle the mass systems move outward to the maximum outward deflection and maximum moment of inertia.

The coils 13 may be energized with a combination of alternating current from a source 11 and direct current from a source 41, such that maximum energization occurs only once in each cycle of the alternating current source 11. Accordingly, the cylinders 9 are driven at the frequency of the alternating current source 11. If preferred, the need for the direct current source 41 may be obviated by the provision either in the bobbins 12 or in the moving systems 9, 10 of permanently magnetized portions so polarized that maximum magnetic field intensity and maximum inward pull is exerted upon the moving systems only once in each cycle of the alternating current through coils 13.

Portions of the rod 2 between the above-described mass system and the anchored ends of the rod are partially cut away and shaped into cruciform sections for increasing the compliance to torsional stresses without seriously impairing the resistance of the rod 2 to bending. The middle section 3 of the rod 2, rigidly fixed to the arms 4, 5 and associated apparatus, is thereby enabled to oscillate relative to frame 1 through an appreciable angular range without exertion of excessive torque.

Figure 3:
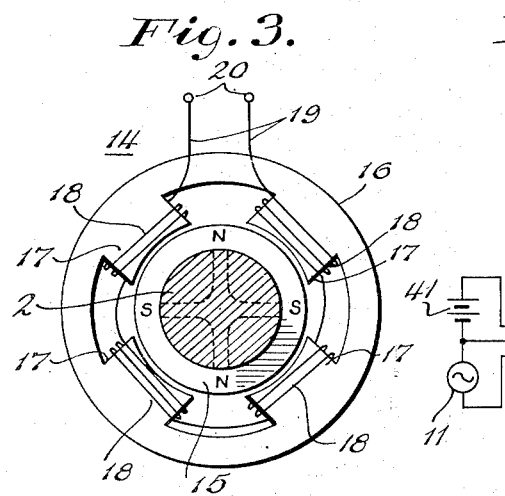
Figure 3 is a sectional plan view of a convenient oscillation pickup element or transducer particularly suitable for use in a device of the type shown in Figure 1, the section being taken on line 3—3 of this Figure.

An oscillation pickup device 14 is provided on rod 2 for producing an alternating output voltage corresponding to the relative angular oscillation between frame 1 and the middle section 3 of the rod 2. While a Rochelle salt crystal could be arranged for this purpose generally in the manner shown in the Lyman U. S. Patent No. 2,513,240 above referred to, there is shown in Fig. 1 an electro-dynamic oscillation pickup arrangement 14 especially suited for this purpose. This device includes a field ring 15 of Alnico or similar alloy permanently magnetized with four non-salient poles alternately north and south, as indicated in Fig. 3. This ring is secured to the middle portion 3 of the rod 2. A soft iron armature 16 having four equally spaced inwardly projecting poles 17 each wound with a coil 18 is fixed to an anchored end of rod 2 with the poles adjacent the field ring 15. The armature 16 is oriented in such a way that the pole projections thereof fall midway between the magnetization poles of the field ring 15. The four armature coils are connected alternately right- and left-handed in series with a pair of leads 19 connected to terminals 20. Upon relative angular oscillation between the frame 1 and the middle portion 3 of the rod 2, an alternating voltage is generated between terminals 20, this alternating voltage being characterized by frequency and phase corresponding to the frequency and phase of relative angular oscillation of rod portion 3, and being of an amplitude substantially proportional to the amplitude of the relative oscillation.

The natural frequency of oscillation of the cylinders 9 along their axes is determined by the stiffness of the diaphragms and the mass of the cylinders 9, and by suitable choice of these constants the natural frequency may be given any desired fixed value within wide limits. In practice, it is desirable that the two masses 9 be equal, and it is desirable to make the natural frequency of vibration of the order of 400 oscillations per second. For best operation of the system, the cylindrical masses 9 should be vibrated in precise phase opposition and through constant and equal amplitudes, the two masses moving concurrently toward the vertical rod 2, to reach their positions of maximum inward deflection simultaneously, and then concurrently moving away from the rod and simultaneously reaching their positions of maximum outward deflection. Under these conditions, the center of gravity of the multi-cylinder mass system remains stationary at the point of intersection of the axes of rod 2 and arms 4 and 5; and hence a condition of dynamic symmetry of movement of the mass elements about this point of intersection is achieved.

With these considerations in view, the source 11 should be a source of constant-amplitude alternating voltage, and it may be arranged to produce vibration of the masses 9 along the axis of arms 4, 5 at a frequency greatly different from the natural resonant frequency of vibration along this axis. Operation in this manner requires high-amplitude energization of the coils 13, but affords some latitude for variations of the frequency of the source 11, and also provides tolerance for minute inequality of the natural periods of the right and left arms of the vibratory system. On the other hand, if the mass systems on the left and right arms 4 and 5 are precisely tuned for equal periods, and are made extremely stable in this respect, and if a very stable oscillator such as a constant-amplitude piezoelectric oscillator having its period fixed to resonance with the vibratory mass system is employed as the driving voltage source 11, then a relatively low-amplitude energizing current in the coils 13 is ample for sustaining vibration of the cylinders 9 along the axis of arms 4, 5 at a satisfactory amplitude.

If the left and right vibratory elements are tuned to precisely equal natural periods and are stable in this respect, they may be made the frequency controlling parts of a sustained oscillation driving system, by employment of a vibration pickup coupled to one or both of the vibratory units 8, 9 and an amplifier for receiving the output voltage therefrom and for providing amplified currents for energizing the driving coils 13. In this respect, the principles of the aforementioned Lyman U. S. Patent No. 2,513,240 as to vibration pickup arrangements and feedback amplification are applicable here.

Since provision of cylinders 9 and associated parts of equal masses and their movement along the axis of arms 4, 5 in dynamic symmetry about the axis of rod 2 results in immobility of the center of gravity of the mass system, no unbalanced alternating stresses are applied to the middle section 3 of rod 2 in a horizontal direction. Moreover, as the movement of the mass of the cylinders has no vertical component, there are no vertical alternating stresses.

When the base or frame 1 of the apparatus of Fig. 1 is rotated about the axis of rod 2 (the response axis) at an angular velocity $\omega$, the mass system including cylinders 9 is rotated therewith and is therefore possessed of an average angular momentum equal to the product I $\omega$, where I is the moment of inertia of the mass system including portions 3, 4, 5, 8, 9, 10, 12, 13 and 15. but the moment of inertia I is modulated according to the movement of the cylinders 9 alternately outward and inward. Accordingly, the angular velocity of the system included on rod portion 3 is modulated according to the requirements for the conservation of angular momentum.

Figure 2:
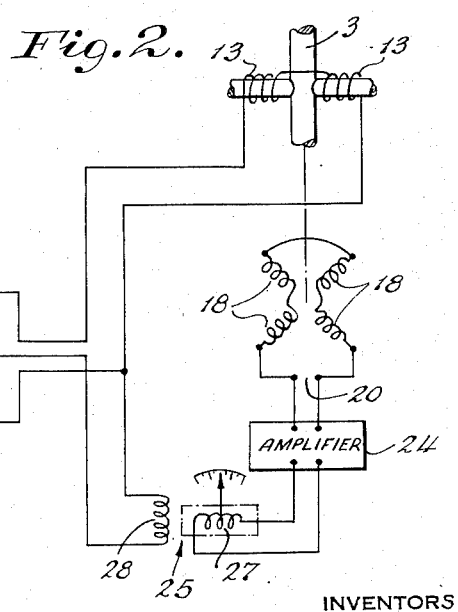
Figure 2 is a diagram of the electrical circuit connections of parts shown in Figure 1.

Arms 4, 5 lag behind the frame 1 as the cylinders 9 move to their maximum distance apart and overtake said frame and lead it slightly when the cylinders approach each other. Consequently, the pickup device or transducer 14 produces an alternating output voltage synchronous with these relative oscillations and of amplitude corresponding to the oscillation amplitude. When the direction of turning is reversed, the alternating output voltage at terminals 20 changes phase by 180°. As indicated in Fig. 2, this variable output voltage developed at terminals 20 may be amplified as by an amplifier 24 and supplied to one winding 27 of a dynamometer type voltmeter or galvanometer 25, the other winding 28 of the meter being excited from source 11 with alternating voltage of constant amplitude and of phase corresponding in a predetermined manner with the vibration phase of cylinders 9, and hence with the modulation of the moment of inertia of the vibratory mass system. The dynomometer type meter 25 connected in this manner indicates both the direction and the magnitude of the angular velocity of the frame 1 about the axis of rod 2, i. e., about the response axis.

For enhanced sensitivity of the arrangement of Fig. 1, the cruciform sections 6 and 7 of the rod 2 are formed to such dimensions that their compliance is related to the moment of inertia of the vibratory system therebetween for resonance at the frequency of the alternating voltage source 11. Consequently, maximum amplitude response about the axis of rod 2 results from a given angular velocity $\omega$. With this feature of resonance for oscillation about the response axis, and with the reduction of disturbing influences in the output of pickup unit 14 by virtue of the stationary center of gravity of the vibratory system, the present invention is made to respond with useful signals corresponding to extremely small values of angular velocity $\omega$.

While the view in Fig. 1 suggests the use of rod 2 in a vertical-axis orientation, as for measuring rate of turn of an aircraft about its normal vertical axis, it will be understood that base or frame 1 may be turned so that rod 2 lies in any desired position, and the apparatus according to the present invention will then indicate the angular velocity around the selected axis along which rod 2 is oriented.

A single pair of oscillating masses such as the cylinders arranged in the manner shown in Figure 1 will under suitable conditions give a reliable indication of angular velocity, but it will be observed that torsional vibration of rod 2 can be transmitted to frame 1. Also vibrations transmitted to the frame from external sources, as from the engines of an aeroplane, for instance, may affect the pickup 14, and vitiate the indications of voltmeter 25. These effects may be mitigated to some extent by making the frame 1 very stiff and massive, but we prefer to adopt the arrangement of Fig. 4 which prevents any vibration generated in the apparatus within frame 1 from reaching the outside world, and at the same time insulates the apparatus from the effects of vibrations transmitted from outside.

Figure 4:
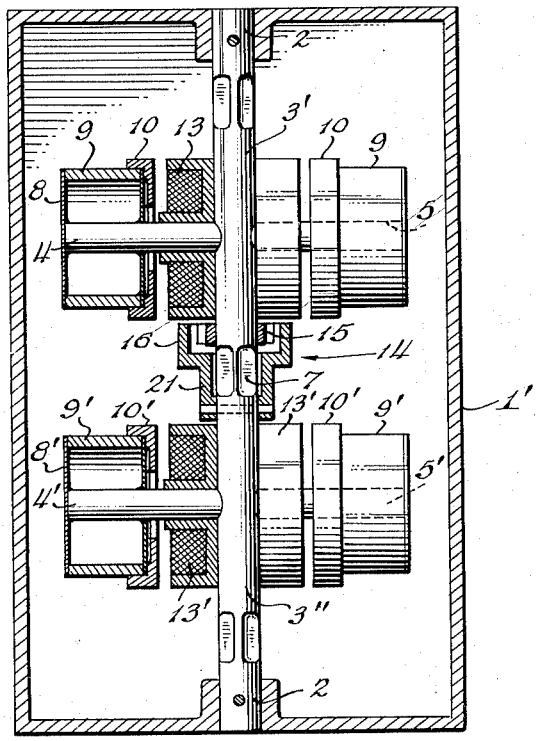
Figure 4 is a side view of a further embodiment of the present invention.

Referring to Fig. 4, two pairs of cylinders 9, 9 and 9', 9' are provided, the second pair 9', 9' being mounted on a second pair of arms 4', 5' projecting from rod 2 parallel to the first pair of arms 4, 5. All four cylinders are carried in an identical manner by diaphragms attached to the arms, and all are provided with means to maintain them in oscillation parallel to the arms as hereinbefore described. The driving means are so arranged that the oscillation of the upper pair of cylinders 9, 9 is of the same frequency and amplitude but 180° out of phase with that of the lower pair 9', 9'. That is to say that when the cylinders 9, 9 are at their maximum distance apart, cylinders 9', 9' will be at their closest to each other; and when cylinders 9, 9 are approaching one another, cylinders 9', 9' will be separating. This may be contrived by making all four caps 10, 10, 10', 10' as permanent magnets and connecting the four driving coils 13, 13, 13', 13' so that the magnets 10, 10 are attracted while magnets 10', 10' are repelled. Either opposite polarization of magnets 10, 10 from that of magnets 10', 10', or opposite phasing of coils 13, 13 from that of coils 13', 13' may be employed for this purpose.

In the arrangement shown in Fig. 4, three cruciform sections are made in rod 2, so positioned as to afford great compliance to an upper section 3' and a lower section 3" of the rod 2, to permit opposite oscillations of appreciable amplitude of the upper system including cylinders 9 and the lower system including cylinders 9'. A pickup unit 14 is provided with the field unit 15 attached to section 3' of rod 2 and with the armature unit 16 attached to section 3" of the rod 2.

When frame 1' is rotated at an angular velocity ω about the response axis (i. e., about the axis of rod 2), the upper and lower vibratory systems, their moments of inertia being modulated in opposite phase, have modulated angular velocities in opposite phase, such that with the upper system leads the frame 1' while the lower system lags, and the upper system then lags while the lower system leads the frame 1'. Hence, the sum of the torsional stresses applied to frame 1' through the rod 2 about the response axis is always zero. Therefore, appreciable relative oscillation is detected between sections 3' and 3" by the pickup unit 14, which is electrically connected in the same manner as shown in Fig. 2.

If the apparatus of Fig. 1 is mounted in an aeroplane it may happen that the vibration of the engine will induce into frame 1 of the instrument a rotary vibration component around the response axis, in such a way that an erroneous signal will be produced to actuate the dynamometer-type voltmeter 25 even when the aircraft is not turning. With the arrangement of Fig. 4, however, an external vibration of this sort so affects the parts of the instrument as to produce no relative movement between the field and armature elements of the pickup 14, and hence, no erroneous signal is produced.

It will be obvious that many modifications can be introduced into the construction without departing from the essence of the invention. For example, although the linear motion of the masses, which is a feature of the present invention, may be assured by mounting them on elastic diaphragms, which perform the triple functions of supporting the weights of the masses, of constraining their motion to a linear path and of applying a restoring force proportional to displacement, these functions may be separated. For example, the masses may be arranged for slidable fit on the arms 4, 5, in which case the diaphragms are only required to supply the elastic restoring force, and could be replaced by helical springs. The arrangement shown in Figs. 2 and 4 is preferable when the masses are required to oscillate with small amplitude at high frequency, and has the advantage of freedom from frictional contact between surfaces. In some cases, however, a large amplitude at a lower frequency may be desired and it might then be preferable to make the masses slide on the rods.

Figure 5:
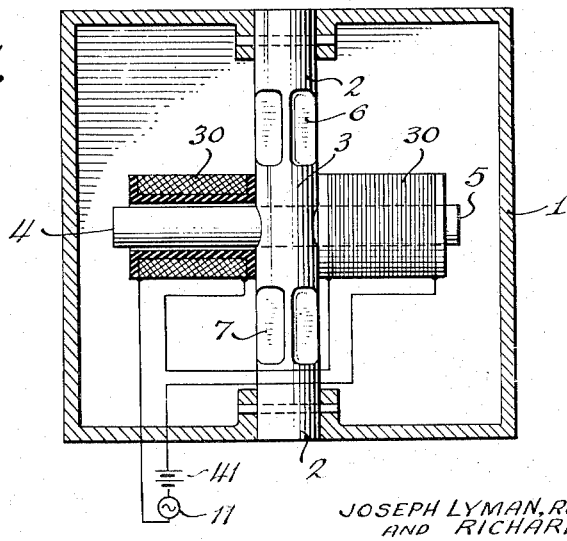
Figure 5 illustrates a vibration-maintaining device alternative to that shown in Figures 1 and 4.

Instead of maintaining the oscillation of the masses by electromagnetic means, advantage may be taken of the phenomenon of magnetostriction according to which a bar of magnetic material experiences a change of length when magnetized. This may be carried into effect in the manner shown in Fig. 5 where iron, steel, nickel or permalloy horizontal bar 4, 5 attached to the vertical rod 2 is surrounded by coil windings 30 supported by the middle portion 3 of the rod 2. When said coils are excited by a source of alternating current 11 and a source 61 of direct current, the arms 4 and 5 are thereby made to elongate and contract alternately, thus providing periodical modulation of the moment of inertia of the system 3, 4, 5.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Vibratory apparatus for the measuring of the angular velocity of an object about a selected axis comprising a base adapted to be secured to the object, a torsion rod secured at each end to said base and normally extending in the direction of said axis, said rod having weakened zones adjacent each end, a plurality of guide members extending radially from said rod in at least one common plane between the weakened zones, like masses mounted on said members for limited radial movement, means for maintaining equal and opposite synchronous oscillation of said masses toward and away from said rod, and signal generating means coupled to said rod on both sides of at least one of said weakened zones and responsive to variations of angular velocity of said rod and base during turning of said base about said axis for deriving therefrom signals corresponding to such variations.

2. In vibratory apparatus for the measurement of angular velocities about a selected axis, a base, an elastic shaft attached to said base, a pair of mass elements, a plurality of elastic diaphragms supporting said elements on said shaft with freedom to oscillate in a straight line normal to said axis and to the planes of the diaphragms to permit variation of the moment of inertia of the mass elements about said axis, means for initiating and maintaining linear oscillation of said mass elements at substantially constant frequency and amplitude and in opposite phase on opposite sides of said shaft so that the common center of gravity of the pair of mass elements is stationary, and means responsive to angular vibration of said mass elements about the axis of said shaft for indicating the angular velocity of said base.

3. In an angular velocity meter, a base, a torsion rod carried by said base, a pair of arms projecting oppositely from said rod at right angles thereto, a mass movably mounted on each arm, means for maintaining said masses in oscillation along said arms and in opposite phase comprising electromagnets carried by said arms or said rod and cooperating with armatures on said masses to maintain them in oscillation when excited by periodically fluctuating currents, whereby the moment of inertia is periodically varied as the masses vibrate, signal means responsive to periodic twist of said rod with respect to its base as it is rotated, and an angular velocity indicator actuated by said signal means.

4. In an angular velocity meter a base, a rod carried by said base, a pair of arms projecting from said rod at right angles thereto, a pair of coaxial cylindrical masses, elastic diaphragms carried on said arms to support said masses, and means for maintaining said masses in oscillation in a straight line parallel to said arms and in opposite phase comprising electromagnets carried by said arms or said rod and cooperating with armatures on said masses to maintain them in oscillation when excited by a periodically fluctuating current.

5. Vibratory apparatus for measuring angular velocity about a selected axis, as claimed in claim 3, in which said common mount connecting said masses to said base is of such stiffness that the natural period of vibration of the masses around said axis equals the period of variation of the moment of inertia of said group of masses.

6. In apparatus for measurement of angular velocity about a selected axis, a base, an elastic shaft attached to said base, a first pair of mass elements, means comprising a first plurality of elastic diaphragms supporting said first mass elements on said shaft with freedom to oscillate in a straight line normal to said axis and to the planes of the diaphragms to permit variation of the moment of inertia of said first mass elements about said axsi, first means for initiating and maintaining linear oscillation of said first mass elements at substantially constant frequency and amplitude in opposite phase on opposite sides of said shaft so that the common center of gravity of said first pair of mass elements is stationary, a second pair of mass elements, means comprising a second plurality of elastic diaphragms supporting said second mass elements on said shaft with freedom to oscillate in a straight line normal to said axis and to the planes of the diaphragms to permit variation of the moment of inertia of said second mass elements about said axis, second means for initiating and maintaining linear oscillation of said second mass elements at substantially constant frequency and amplitude in opposite phase on opposite sides of said shaft so that the common center of gravity of said second pair of mass elements is stationary, said first and second means for initiating and maintaining linear oscillation of the respective mass elements being so phased that when the first pair of mass elements are approaching each other the second pair are separating from each other, and means responsive to angular vibration of said pairs of mass elements about the axis of said shaft for indicating the angular velocity of said base.

JOSEPH LYMAN.
ROLAND E. BARNABY.
RICHARD PROSKAUER.

REFERENCES CITED

The following references are of record in the file of this patent:

UNITED STATES PATENTS

| Number | Name | Date |
|---|---|---|
| 2,309,853 | Lyman | Feb. 2, 1943 |
| 2,513,340 | Lyman | July 4, 1950 |